(12) United States Patent
Hermann et al.

(10) Patent No.: US 6,495,930 B1
(45) Date of Patent: Dec. 17, 2002

(54) METHOD AND APPARATUS FOR CHECKING AN ELECTRIC CIRCUIT, IN PARTICULAR AN IGNITION CIRCUIT OF A MOTOR VEHICLE OCCUPANT PROTECTION SYSTEM

(75) Inventors: Stefan Hermann, Köfering (DE); Michael Köppl, Sinzing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/716,537

(22) Filed: Nov. 20, 2000

Related U.S. Application Data

(63) Continuation of application No. PCT/DE99/01317, filed on May 3, 1999.

(30) Foreign Application Priority Data

May 20, 1998 (DE) .......................................... 198 22 780

(51) Int. Cl.⁷ ............................................... G01R 31/02
(52) U.S. Cl. ..................................... 307/10.1; 307/121
(58) Field of Search .............................. 307/10.1, 121; 324/502, 522, 523, 525, 527; 280/735

(56) References Cited

U.S. PATENT DOCUMENTS

| 4,949,211 A | * | 8/1990 | Edwards | ....................... 361/18 |
| 5,459,449 A | * | 10/1995 | Ravas, Je. et al. | .......... 280/735 |
| 5,461,358 A | * | 10/1995 | Ravas, Jr. et al. | .......... 280/735 |
| 5,825,282 A | * | 10/1998 | Aronne | ........................ 280/735 |
| 6,070,687 A | * | 6/2000 | Wallace et al. | .............. 180/287 |

FOREIGN PATENT DOCUMENTS

| DE | 44 22 264 A1 | 1/1996 | | |
| DE | 195 32 628 A1 | 3/1997 | | |
| EP | 0 752 592 A2 | 1/1997 | | |
| JP | 07 132 794 | 5/1995 | | |
| JP | 8-310338 A | * 11/1996 | .......... B60R/21/32 |
| WO | WO 97/29932 | 8/1997 | | |

OTHER PUBLICATIONS

Astrid Lehmann: "sicher auslösen—Airbag–Zünder richtig testen" [trigger safely –testing airbag ignition correctly], ELEKTRONIKPRAXIS, No. 20, Oct. 21, 1997, p. 309.

* cited by examiner

*Primary Examiner*—Fritz Fleming
(74) *Attorney, Agent, or Firm*—Laurence A. Greenberg; Werner H. Stemer; Ralph E. Locher

(57) ABSTRACT

An apparatus and method test an electric circuit. During the testing of the switches connected in series with the ignition pellet, the maximum current flowing through the respective switch to be tested is limited to a value that is insufficient for igniting the ignition pellet even in the event of a leak occurring. This current limiting is preferably achieved by reducing the switch gate voltage while the switch test is being accomplished.

12 Claims, 1 Drawing Sheet

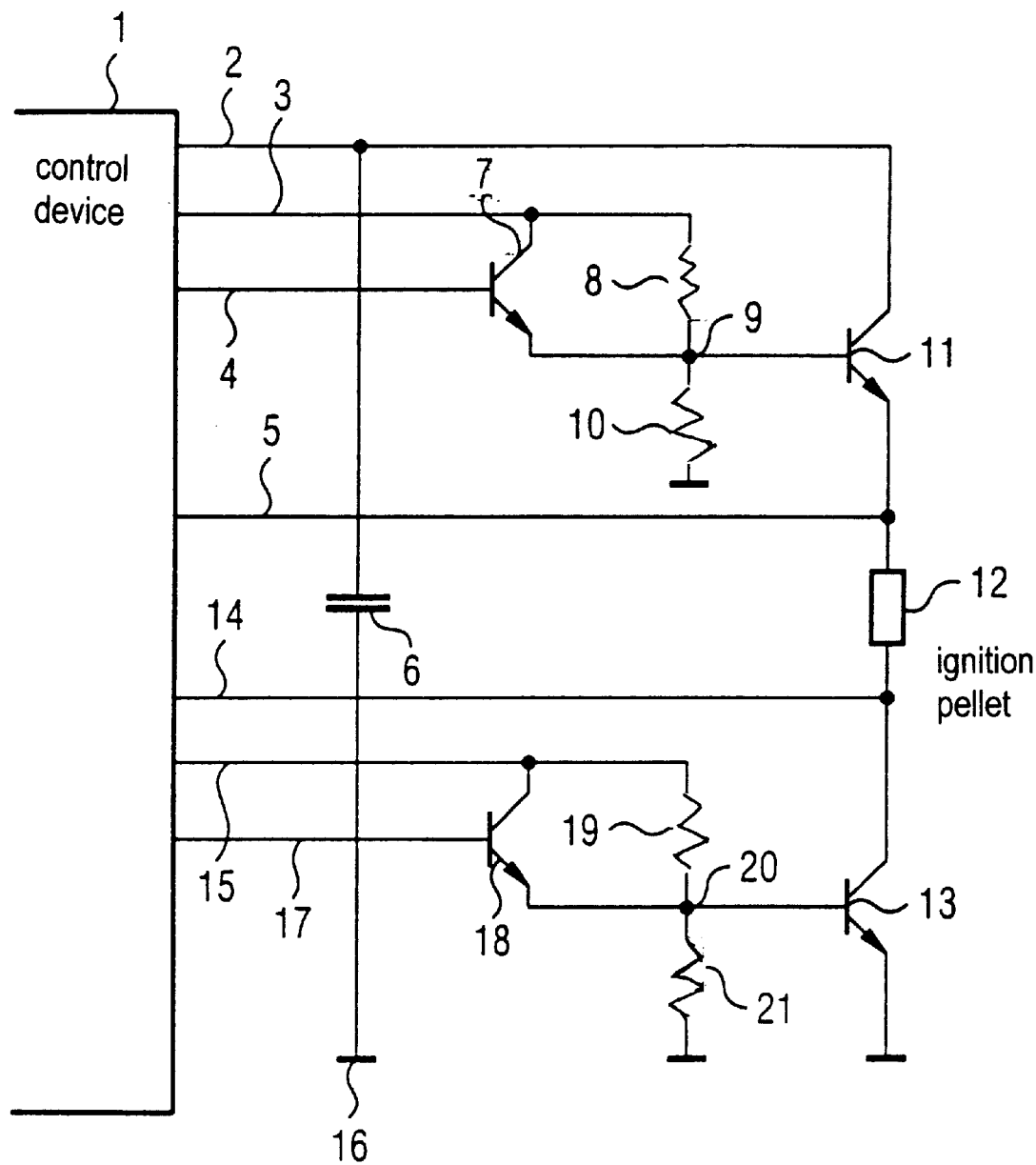

METHOD AND APPARATUS FOR CHECKING AN ELECTRIC CIRCUIT, IN PARTICULAR AN IGNITION CIRCUIT OF A MOTOR VEHICLE OCCUPANT PROTECTION SYSTEM

CROSS-REFERENCE TO RELATED APPLICATION

This is a continuation of copending international application PCT/DE99/01317, filed May 3, 1999, which designated the United States.

BACKGROUND OF THE INVENTION

FIELD OF THE INVENTION

The invention relates to a method and an apparatus for checking an electric circuit that reacts very rapidly when specific conditions occur. In particular, the invention relates to an ignition circuit of a motor vehicle occupant protection system.

By way of example, in a motor vehicle occupant protection system, upon detection of an accident, the ignition pellet or ignition pellets must activate very rapidly to time correctly the triggering of the occupant protection apparatus, e.g. of an airbag or of a seatbelt pretensioner. For this purpose, switches connected in series with the ignition pellet are switched on, so that a high current, which initiates the triggering, flows through the ignition pellet. For safety, the functionality of these switches is tested when the system is switched on. For example, the functionality is tested when the motor vehicle engine is started or when the control unit of the occupant protection system is initialized. The switches connected to the ignition pellet are individually turned on one after the other, and the change in potential occurring at the switch output is detected and evaluated for the purpose of checking the switch functionality. Successively turning on the switches connected to the ignition pellet prevents the ignition pellet from triggering unintentionally during this switch test. This is true because the switch that is currently not being tested and is therefore open blocks a current flow flowing through the ignition pellet. Specifically, at the time of the switch checking, the energy storage capacitor serving as energy source for the ignition pellet is usually already completely charged. Because the capacitor is fully charged, the ignition pellet would be triggered if the switch to be tested switches simultaneously with the further electrically controllable switch or a mechanical acceleration switch present in the ignition circuit.

However, a leakage resistance (with respect to ground potential and/or supply voltage or the ignition capacitor) in the ignition circuit could cause the ignition of the ignition pellet during a switch closing during the switch test, because the leakage resistance could create an excessively high current flow.

In order to avoid such faulty ignitions, a leakage measurement is generally completed before the switch test. During the leakage measurement, the magnitude of a leakage current possibly flowing in the circuit is measured. If a great enough leakage current is detected, the switch checking is disabled. This leakage current measurement can discern a leak resistance from a short circuit at the ignition pellet.

Such a leakage measurement is disclosed in more detail in German Published, Non-Prosecuted Patent Application DE 44 22 264 A1. According to this document, an alarm signal is generated if the leakage current reaches or exceeds a threshold value during the leakage current measurement.

In this reference, the leakage current measurement temporally precedes a switch checking process. This step is repeated cyclically if appropriate. However, even after a leakage measurement that does not show any problems has been completed, leakage resistances nevertheless can be formed. For example, leakage resistances can form from very great temperature effects, changes in individual switching elements, contaminants, or the like. If switch checking is carried out after the formation of such a newly occurred leakage resistance, the ignition pellet may be triggered. Undesirable activation arises with other types of circuit elements (e.g., fuses) that activate in an emergency or under specific conditions and effect automatic destruction of the circuit when the specific conditions occur.

European Patent Application EP 0 752 592 A2 shows a method for checking an electric circuit. The electric circuit contains at least one switch. The switch is designed as a transistor and is connected to a DC voltage source. The circuit further includes an activatable circuit element connected to the switch and activated by current feeding with a current lying above a specific current value. When the specific current value is exceeded during the checking of the functionality of the switch, the current flow through the switch is limited to a current value that is insufficient for activating the activatable circuit element. EP 0 752 592 A2 also shows an apparatus for checking an electric circuit containing at least one switch. The switch is designed as a transistor and is connected to a DC voltage source. The circuit includes an activatable circuit element connected to the switch and activated by current feeding with a current lying above a specific current value. When the specific current value is exceeded during the checking of the functionality of the at least one switch, the current flow through the switch is limited to a current value that is insufficient for activating the activatable circuit element. The circuit contains an ignition pellet located between two switches. High-resistance current sources are connected in parallel with the switches. In order to test the switches, the respective switch to be tested and the high-resistance current source located on that side of the ignition pellet which is remote from said switch are switched on. The current source limits the current flowing through the switch to a low current value that does not effect ignition triggering. Prior to switch checking, insulation checking is completed so that an excessively high current caused by insulation faults can be avoided during the subsequent switch checking.

An article entitled "Elektronik Praxis," *Practical Electronics*, No. 20, Oct. 21, 1997, page 126, specifies limiting the measurement current during the testing of an airbag igniter. Furthermore, the insulation resistance between the ignition element and the housing surrounding the latter is measured.

SUMMARY OF THE INVENTION

It is accordingly an object of the invention to provide a method and apparatus for checking an electric circuit, in particular an ignition circuit of a motor vehicle occupant protection system that overcomes the hereinafore-mentioned disadvantages of the heretofore-known devices of this general type and that provide a method and an apparatus for checking electric circuits that enable reliable transistor checking. This transistor checking is to be completed in a simple manner without the risk of undesirable activations of the activatable circuit element. This object is achieved, with regard to the method, by the above-described method and apparatus.

With the foregoing and other objects in view, there is provided, in accordance with the invention, a method for checking an electric circuit. The method includes the following steps.

providing a circuit containing a switch designed as a transistor having a gate voltage. The switch activates upon receiving a current feeding lying above a specific current value. This specific current value produces an associated specific voltage value.

connecting the switch to a DC voltage source and an activatable circuit element at a junction point. passing a current flow through the switch which is less than the specific current value.

limiting the gate voltage of the transistor during said passing to a smaller value than the associated specific voltage value.

monitoring a change in potential occurring at the junction, point during said passing.

In accordance with another feature of the invention, the method includes measuring a leakage measurement before said passing.

In accordance with another feature of the invention, the method includes measuring a leakage measurement after said passing.

With the foregoing and other objects in view, there is provided, in accordance with the invention, an apparatus for checking an electric circuit. The apparatus includes the following:

a switch having a functionality. The switch is designed as a transistor having an activation and a gate voltage. The switch connects to a DC voltage source.

an activatable circuit element connected to the switch with a junction point located therebetween. The activatable circuit element activates when receiving a current feeding lying above a specific current value.

a control device controlling the activation of the transistor, passing a current lying below the specific current value. The current produces a resulting gate voltage of the transistor that is less than a resulting gate voltage produce by a current of at least the specific current value. The control device monitors a change in potential occurring at the junction point.

In accordance with another feature of the invention, the activatable circuit element is an ignition pellet of a motor vehicle occupant protection system, and the transistor connects in series with the ignition pellet. The motor vehicle occupant protection system can be an airbag system.

In accordance with another feature of the invention, the apparatus further includes:

a gate line connected to the transistor; and a current-limiting element connected in the gate line. The current-limiting element can be a resistor.

a switching element for activating and deactivating the current-limiting element connected in the gate line. The switching element can be a switching transistor.

In accordance with another feature of the invention, the apparatus includes two lines connected to the activatable circuit element for carrying out a leakage measurement.

In the invention, the gate voltage of the transistor acts as a switch that prevents the transistor from fully turning on. This automatically limits the current flowing through it to a non-critical value that is insufficient for triggering the activatable circuit element but nevertheless enables reliable detection of the switching behavior of the transistor. A separate current source is not necessary in this solution. Moreover, all of these transistors can be checked simultaneously if a multiplicity of transistors forms the switch to be tested. It is also the case here that all the gate electrodes of all the transistors can be connected directly to one another and need not be selectively addressable. The monitoring of the change in potential occurring at the transistor output means that the transistor checks also can be effected, if appropriate, without an appreciable current flow and thus essentially in a loss-free manner.

The current limiting during the switch test allows the preceding leakage current measurement to be omitted. Preferably, such a leakage current measurement is nevertheless completed before or after the switch test so that the switching behavior of the circuit can be better assessed in to the event of an emergency.

The invention is preferably used in a motor vehicle occupant protection system, in particular an airbag system or seatbelt pretensioner system or the like. In such a case, the invention primarily checks the functionality and the switching behavior of the switches that are connected to the ignition pellet or pellets, and, in the event of an (imminent or actually occurred) accident, are closed in order to trigger the occupant protection system. However, the invention also can be used for testing other types of circuits with a circuit element. An example of these circuits is a fuse that activates under specific circumstances and triggers an irreversible process.

Although the invention is illustrated and described herein as embodied in a method and apparatus for checking an electric circuit, in particular an ignition circuit of a motor vehicle occupant protection system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The sole FIGURE of the drawings is a circuit diagram.

DESCRIPTION OF THE PREFERRED EMBODIMENTS

A control device (control unit) 1 is connected in a manner known per se to the on-board electrical system for voltage feeding and also to accident sensors for detecting an accident, e.g. an impact, overturning or unnaturally high deceleration/acceleration. During motor vehicle operation, the control device 1 generates on a line 2 a constant DC voltage of twelve to thirteen volts (12–13 V), for example, which serves, inter alia, for charging an energy storage capacitor 6 connected between the line 2 and circuit reference-ground potential (ground potential) 16. Connected in parallel with the energy storage capacitor 6 is a series circuit. The series circuit comprises a first controllable transistor 11 in the form of a transistor (in particular field-effect transistor), an ignition pellet 12 that triggers the airbag gas generator, and a further, electrically controllable switch 13 in the form of a transistor (in particular a FET). When an accident has been detected, the control device 1 generates control signals for simultaneously turning on the switches 11 and 13. When the switches 11 and 13 are turned on, a high current immediately flows through and ignites the ignition pellet 12. This high current is of the order of magnitude of two to four amps (2 to 4 A). The maximum current during ignition preferably is limited to below four amps (<4 A). By controlling the current, the energy present in the energy storage capacitor 6 and/or the power output by the control device 1 via the line 2 also suffice/suffices for the ignition of a further ignition pellet (not shown) connected in parallel. The current can be limited with current-limiting elements (not shown). The currentlimiting elements are arranged in the control device 1 and/or between the energy storage capacitor 6 and the ignition pellet or pellets 12.

In order to check the functionality of the ignition circuit, the switches 11 and 13 connected to the ignition pellet 12 are subjected to a function test in a manner staggered over time. This function test can be carried out when the motor vehicle ignition is switched on and/or at regular or irregular intervals during motor vehicle operation. In order to test the functionality of the transistor 11, the control device 1 generates on a line 3 a voltage signal having an amplitude that suffices for completely turning on the transistor 11. The voltage signal preferably can have a value between one and three volts (1 to 3 V). This voltage is applied to a resistor-type voltage divider having resistors 8 and 10, which are connected between the line 3 and ground potential. The junction point 9 between the resistors 8 and 10 is connected to the gate of the transistor 11, with the result that the voltage reduced by the resistive division is applied to the gate of the transistor 11. The divider ratio of the resistors 8 and 10 is fixed such that the voltage occurring at the junction point 9 has a low value, which is insufficient for completely turning on the transistor 11. The transistor 11 thus acts like a relatively large resistor that limits the current flowing through the transistor 11. Thus, the current flowing to the ignition pellet 12 is also limited to a value that is less than that required for ignition. This value for the current is preferably less than five hundred milliamps (>500 mA), and most preferably about one-hundred-sixty milliamps (~160 mA). In the normal case, the switch 13 is open during this switch test, so that normally no appreciable current flows. However, if a leak has occurred and the other connection of the ignition pellet 12 (this connection not being connected to the transistor 11) is connected to ground potential on account of a functional error, a short circuit, or the like, the current limiting of the switch test current reliably prevents ignition of the ignition pellet 12.

A switching transistor 7 controlled by the control device 1 via a gate line 4 connects in parallel to the resistor 8. If the control device 1 detects the need for triggering the occupant protection system on account of an accident, the control device 1 puts the lines 3 and 4 simultaneously at high potential, with the result that the switching transistor 7 turns on and thus short-circuits the resistor 8. As a result, the entire voltage present on the line 3 is applied to the gate of the transistor 11, so that the latter turns on completely; i.e. does not perform a current-limiting function. Because the switch 13 is also completely turned on at the same time, a high current flows through and immediately ignites the ignition pellet 12.

The switching transistor 7 can also be omitted, if appropriate. In this case, the line 4 is directly connected to the junction point 9. If an accident has been detected, a voltage sufficient for completely turning on the transistor 11 is applied to said line. In this case, the line 3 need not be put at high potential at the same time when an accident has been detected. The resistance of the resistors 8 and 10 is chosen to be sufficiently high such that the current flow flowing through said resistors is very low to negligible.

As a further alternative, instead of the resistor 8, a zener diode may be connected between the gate of the transistor 11 and the line 3. The zener diode reduces the voltage occurring at the gate of the transistor 11 during a switch test to a value that is insufficient for complete turn-on. In this case, the switching transistor 7 connects in parallel with the zener diode. The switching transistor turns on during the intentional ignition of the ignition pellet 12 and thus shortcircuits the zener diode. The result is that the entire gate voltage is applied to the transistor 11.

A line 5 connects to the junction point between the transistor 11 and the ignition pellet 12. The line leads to the control device 1 and monitors the change in potential occurring at the junction point during the switch test. If the transistor 11 switches correctly, the potential at the junction point during the switch test rises approximately to the voltage value of the line 2, whereas the voltage on the line 5 remains too low in the event of a faulty switching function. As a result, the control device 1 checks the function and, if appropriate also the temporal behavior of the transistor 11.

At the same time, the line 5 can also be used for carrying out a leakage measurement. This leakage measurement is performed during initialization of the control device 1 or at another suitable time. In this case, the control device 1 can, for example, impress a specific voltage on the line 5 and measure the current flowing on the line 5, which current should be zero in the leak-free state on account of the open switches 11 and 13.

The above explanations with regard to the switch test of the transistor 11 and the circuitry provided therefor, and also with regard to the leakage measurement by means of the line 5, also apply in the same way to the switch test of the transistor 13, which is carried out staggered in time, and the leakage measurement via the line 14. Also, in this case, the switch test circuit contains a series circuit of resistors 19 and 21. These resistors connect between the ground potential 16 and the line 15, which has voltage applied to it when the test of the switch 13 is carried out and in the event of an accident. The tap 20 between the resistors 19 and 21 is connected to the gate of the transistor 13. Connected in parallel with the resistor 19 is the collector-emitter path of a switching transistor 18, whose gate is controlled by the control device 1 via a line 17. On account of the identical circuit structure, reference is made, in order to avoid repetition, to the above explanations with regard to the method of operation and the alternative configurations.

As an alternative, the two electrically controllable switches 11, 13 can be replaced by a mechanical switch, for example a mechanical acceleration switch, which serves as a safety sensor and activates only in the event of the occurrence of high acceleration (or deceleration) signaling a vehicle accident.

We claim:

1. A method for checking an electric circuit, which comprises:
    providing a circuit containing a DC voltage source, an activatable circuit element having an activation current, a transistor between the DC voltage source and the activatable circuit element having a gate terminal, and a junction point between the transistor and the activatable circuit element;
    providing the gate terminal with a voltage causing a current in the circuit;
    limiting the gate terminal voltage to a value smaller than a value causing the activation current; and
    monitoring a change in potential occurring at the junction point.

2. The method according to claim 1, which further comprises:
    measuring a leakage measurement before the passing step.

3. The method according to claim 1, which further comprises:

measuring a leakage measurement after the passing step.

4. The method according to claim 1, wherein the activatable circuit element is an ignition pellet.

5. An apparatus for checking an electric circuit comprising:

a transistor having a gate terminal, an activatable circuit element connected to said transistor and being activatable upon receiving a sufficient activation current, said transistor producing a current in said activatable circuit element when said gate terminal is provided with a voltage from the DC voltage source, a junction point located between said gate terminal and said activatable circuit element, and a control device controlling the activation of said transistor, passing to said gate terminal a voltage having a value less than the value needed to produce the activation current in said activatable circuit element, and monitoring a change in potential occurring at said junction point.

6. The apparatus according to claim 5, wherein said activatable circuit element is an ignition pellet of a motor vehicle occupant protection system, and said transistor connects in series with said ignition pellet.

7. The apparatus according to claim 6, wherein said motor vehicle occupant protection system is an airbag system.

8. The apparatus according to claim 5, further including:

a gate line connected to said transistor;

a current-limiting element connected in said gate line; and a switching element for activating and deactivating said current-limiting element connected in said gate line.

9. The apparatus according to claim 8, wherein said current-limiting element is a resistor.

10. The apparatus according to claim 8, wherein said switching element is a switching transistor.

11. The apparatus according to claim 5, further comprising:

two lines connected to said activatable circuit element for carrying out a leakage measurement.

12. The method according to claim 5, wherein said activatable circuit element is an ignition pellet.

* * * * *